United States Patent
Berk et al.

(10) Patent No.: US 10,943,399 B2
(45) Date of Patent: Mar. 9, 2021

(54) SYSTEMS AND METHODS OF PHYSICS LAYER PRIORITIZATION IN VIRTUAL ENVIRONMENTS

(71) Applicant: Microsoft Technology Licensing, LLC, Redmond, WA (US)

(72) Inventors: Brandon Richard Berk, Bellevue, WA (US); Andrei Andreevich Borodin, Seattle, WA (US); Michael Jordon Felice, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/688,622

(22) Filed: Aug. 28, 2017

(65) Prior Publication Data
US 2019/0066380 A1   Feb. 28, 2019

(51) Int. Cl.
*G06T 19/00* (2011.01)
*G06F 3/01* (2006.01)
*G02B 27/01* (2006.01)
*G06F 1/16* (2006.01)
*G06F 3/0346* (2013.01)

(52) U.S. Cl.
CPC ........ *G06T 19/006* (2013.01); *G02B 27/0172* (2013.01); *G06F 1/1694* (2013.01); *G06F 3/011* (2013.01); *G06F 3/012* (2013.01); *G06F 3/017* (2013.01); *G06F 3/0346* (2013.01); *A63F 2300/6018* (2013.01); *G02B 2027/0112* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 9,317,972 | B2 | 4/2016 | Forutanpour et al. |
| 9,361,730 | B2 | 6/2016 | Keating et al. |

(Continued)

FOREIGN PATENT DOCUMENTS

| | | |
|---|---|---|
| EP | 2652940 A1 | 10/2013 |
| WO | 2014093608 A1 | 6/2014 |

(Continued)

OTHER PUBLICATIONS

Szymczyk, Matthew, "IVO—Interactive Virtual Object Engine for Augmented Reality and Virtual Reality Environments", http://zugara.com/ivo-interactive-virtual-object-engine-for-augmented-reality-and-virtual-reality-environments, Retrieved on: Oct. 3, 2016, 3 pages.

(Continued)

*Primary Examiner* — Kyle Zhai
(74) *Attorney, Agent, or Firm* — Ray Quinney & Nebeker P.C.; John O. Carpenter (57) ABSTRACT

A method of presenting visual information to a user includes acquiring a first surface mesh relative to the user, acquiring a second surface mesh relative to the user, assigning a first physics layer to the first surface mesh, assigning a second physics layer to the second surface mesh, and prioritizing the first physics layer over the second physics layer independent of a relative position of the first physics layer and the second physics layer in a shared environment for interactions with a first object associated with the first surface mesh and a second object associated with the second surface mesh.

20 Claims, 7 Drawing Sheets

(56) References Cited

U.S. PATENT DOCUMENTS

| | | | |
|---|---|---|---|
| 2005/0179703 A1* | 8/2005 | Johnson | G06F 9/452 345/632 |
| 2010/0017722 A1 | 1/2010 | Cohen | |
| 2011/0080412 A1* | 4/2011 | Miyata | G05B 19/4069 345/473 |
| 2011/0187706 A1* | 8/2011 | Vesely | G06F 3/013 345/419 |
| 2012/0113223 A1 | 5/2012 | Hilliges et al. | |
| 2013/0050258 A1* | 2/2013 | Liu | G02B 27/017 345/633 |
| 2014/0002444 A1* | 1/2014 | Bennett | G06F 3/012 345/419 |
| 2014/0002491 A1 | 1/2014 | Lamb et al. | |
| 2014/0085282 A1* | 3/2014 | Luebke | G06F 3/147 345/207 |
| 2014/0104274 A1 | 4/2014 | Hilliges et al. | |
| 2014/0132629 A1 | 5/2014 | Pandey et al. | |
| 2016/0196692 A1 | 7/2016 | Kjallstrom et al. | |
| 2017/0109936 A1 | 4/2017 | Powderly et al. | |

FOREIGN PATENT DOCUMENTS

| | | |
|---|---|---|
| WO | 2016014874 A1 | 1/2016 |
| WO | 2016071690 A1 | 5/2016 |

OTHER PUBLICATIONS

Wernberger, et al., "SnapToReality: Aligning Augmented Reality to the Real World", In Proceedings of Conference on Human Factors in Computing Systems, May 7, 2016, 12 pages.

Clinker, et al., "Confluence of Computer Vision and Interactive Graphics for Augmented Reality", In Journal of PRESENCE: Teleoperations and Virtual Environments Special Issue on Augmented Reality, vol. 6, No. 4, Aug. 1997, 20 pages.

"International Search Report and Written Opinion Issued in PCT Application No. PCT/US2018/038665", dated Sep. 19, 2018, 14 Pages.

* cited by examiner

SYSTEMS AND METHODS OF PHYSICS LAYER PRIORITIZATION IN VIRTUAL ENVIRONMENTS

CROSS-REFERENCE TO RELATED APPLICATIONS

N/A

BACKGROUND

Use of computing devices is becoming more ubiquitous by the day. Computing devices range from standard desktop computers to wearable computing technology and computers integrated into many commonplace devices. Due to the variety of device and applications, computing devices are being used in an ever-increasing variety of environments and conditions.

Wearable computing devices such as augmented reality (AR), mixed reality (MR), and virtual reality (VR) head-mounted displays are used in a variety of environments. Combining the surrounding physical environment of a user with a virtual environment includes creating a set of physics layers that represent both the physical objects and the virtual objects in a shared environment of the virtual and physical environment. Conventional head-mounted displays use the user's line of sight to determine what objects are available for the user to interact with. In confined areas, such as tunnels, small rooms, flight simulators, or other small physical or virtual environments, the positioning of virtual objects is limited by the space available.

SUMMARY

In some embodiments, an electronic system includes a head-mounted display including a camera and a near-eye display, a microprocessor, and a storage device. The microprocessor is in data communication with the camera and the near-eye display. The storage device is in data communication with the processor and has instructions stored thereon. When executed by the microprocessor, the instruction cause the microprocessor to image at least a part of a surrounding physical environment with the camera, identify a physical object in the surrounding physical environment, generate a virtual object for display on the near-eye display in a virtual environment where the virtual environment and surrounding physical environment overlap in a shared environment, assign a first physics layer to the virtual object, assign a second physics layer to the physical object, and prioritize the first physics layer over the second physics layer independent of a relative position of the virtual object and the physical object in a shared environment for interactions with the virtual object and the physical object.

In other embodiments, a method of presenting visual information to a user includes acquiring a first surface mesh relative to the user, acquiring a second surface mesh relative to the user, assigning a first physics layer to the first surface mesh, assigning a second physics layer to the second surface mesh, and prioritizing the first physics layer over the second physics layer independent of a relative position of the first physics layer and the second physics layer in a shared environment for interactions with a first object associated with the first surface mesh and a second object associated with the second surface mesh.

In yet other embodiments, a computer readable medium includes instructions stored thereon that, when executed by a microprocessor, cause the microprocessor to acquire a first surface mesh relative to an HMD, acquire a second surface mesh relative to the HMD, assign a first physics layer to the first surface mesh, assign a second physics layer to the second surface mesh, and prioritize the first physics layer over the second physics layer independent of a relative position of the first physics layer and the second physics layer in a shared environment for interactions with a first object associated with the first surface mesh and a second object associated with the second surface mesh.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for improving interaction with objects presented to a user in a virtual environment. In at least one embodiment, this disclosure relates to devices, systems, and methods for improving interaction with objects presented to a user in a virtual environment in a head-mounted display (HMD). A system may present a user one or more virtual objects in a virtual reality, mixed reality, or augmented reality environment. The virtual objects may be presented to the user visually interlaced with the physical surroundings or in a fully virtual presentation. In some embodiments, the virtual environment may include one or more reconstructions of surfaces or objects in the physical environment, such as a wall, a floor, or a table.

A virtual object presented to the user may be presented at a simulated depth from the user. For example, a near-eye display of the HMD may provide different images to each of the user's eyes: simulating parallax and creating the perception of depth to the virtual object. The parallax may be calculated based on a virtual position of the virtual object in either the fully virtual environment or a shared environment between the virtual environment presented by the HMD to the user and the surrounding physical environment of the user. For example, a virtual object may be presented at a simulated five-foot depth from the user within an office. Conventionally, a virtual object is positioned within the surrounding physical environment of the user. In some embodiments according to the present disclosure, a first virtual object may be presented to a user, and the user may interact with the first virtual object, at a depth greater than another physical or second virtual object in line with the first virtual object.

In some examples, a HMD may display one or more virtual objects to a user in combination with the surrounding physical environment of the user in a mixed reality application. The surrounding physical environment may include one or more physical objects that are in close proximity to a user and would otherwise prevent a physical object from being positioned in the user's field of view. For example, the virtual object may be presented at a simulated one meter depth from the user within a walled desk (e.g., a cubicle desk), with the virtual object appearing to be beyond and/or through the wall of the desk. The HMD may prioritize presentation and/or interaction with virtual object over the physical object and/or another virtual object irrespective of the simulated and/or calculated depth of the objects.

In at least one embodiment, positioning and/or interacting with a virtual object at a depth greater than another nearer object along a ray or other line-of-sight may be beneficial for the comfort and ease-of-use of the user. For example, in a small physical environment, such as a cockpit or a maintenance tunnel, presenting and interacting with virtual information beyond the constraints of the physical environment may allow for less eye fatigue and/or ease of focusing on the virtual information over the duration of a usage session. In another example, the surface mesh of an imaged physical object and/or environment may have one or more abnormalities in the surface mesh that do not accurately represent the physical object. Displaying and/or interacting with a virtual object "through" an abnormality in a surface mesh may eliminate display artifacts and interaction failures otherwise caused by the abnormality.

A contemplated implementation is a computer technician working on server wiring, and virtual information regarding the computer system may be presented at a one-meter depth despite the space between the server stacks being less than one meter. As the technician may work in such constrained environments for extended periods during the day or on successive days, reading information at less than one meter depth may cause unnecessary eye strain or fatigue. A system according to the present disclosure may reduce and/or eliminate such unnecessary eye strain or fatigue.

In at least another embodiment, the position of a virtual object may be constant in a virtual environment as the user physically moves in a shared environment including the virtual environment and a physical environment. A physical object in the shared environment may be positioned between the user and the virtual object. Conventionally, the physical object would occlude the virtual object and impair or prevent interaction with the virtual object. In at least one embodiment according to the present disclosure, the virtual object may be presented to the user in the original location "through" the physical object and the user may interact with the virtual object "through" the physical object.

Figure 1:
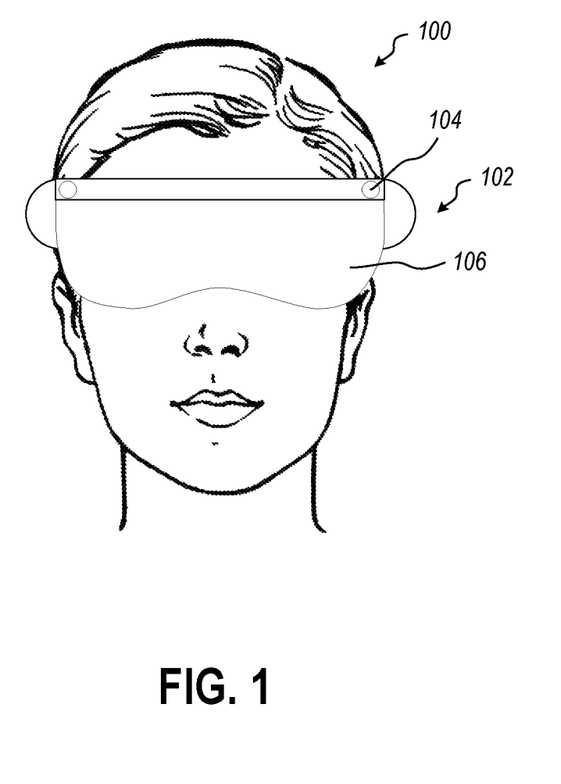
FIG. 1 is a front view of a user wearing an embodiment of a head-mounted display (HMD), according to the present disclosure.

FIG. 1 is a front view of a user 100 wearing a HMD 102. In some embodiments, the HMD 102 may have one or more cameras 104 to image a surrounding physical environment of the user 100 and one or more near-eye displays 106 to present virtual information to the user 100. The camera 104 may be a depth camera that may collect a three-dimensional image of the user's surrounding physical environment. For example, the camera 104 may be an active depth camera including an illuminator for structured light or time of flight depth measurements. In another example, the camera 104 may be a passive depth camera without an illuminator, such as a stereo camera with two imaging sensors displaced from one another.

The near-eye display 106 may include a single near-eye display that provides virtual information to both eyes, or a plurality of discrete near-eye displays 106 that provide virtual information to each eye. The virtual information may include virtual objects displayed on a transparent display, such as a transparent waveguide or other transparent near-eye displays 106, or on an opaque display, such as a liquid crystal display, a light emitting diode display, a projected laser display (e.g., a microelectromechanical system display), or other opaque near-eye displays 106.

Figure 2A:
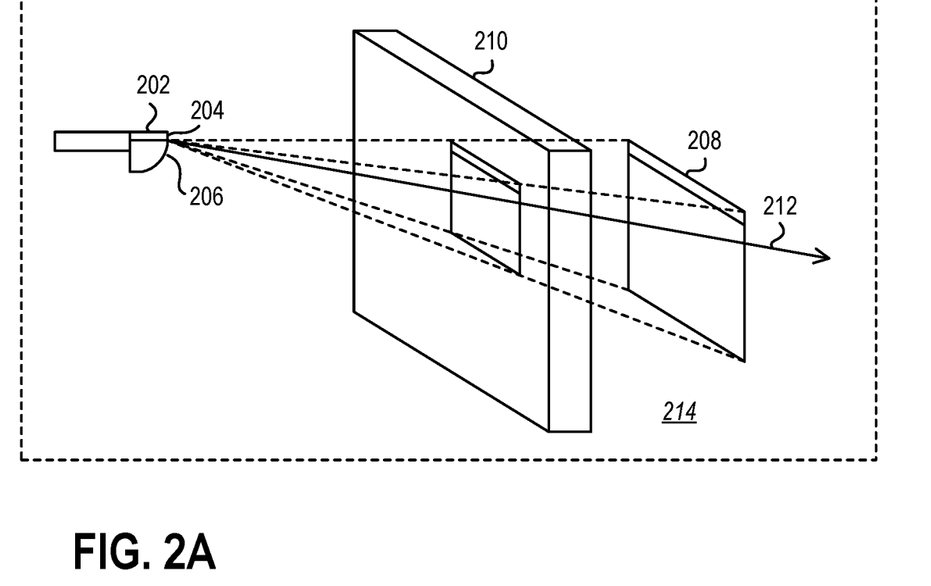
FIG. 2A is a schematic view of an embodiment of a shared environment presented by a HMD, according to the present disclosure.
Figure 2B:
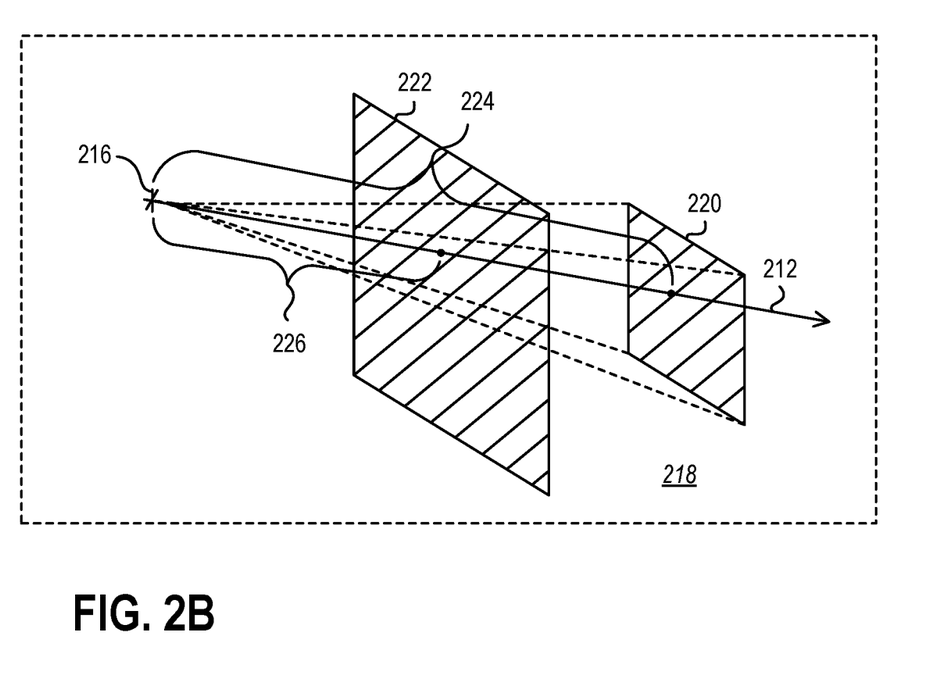
FIG. 2B is a schematic view of an embodiment of physics layers associated with the mixed reality environment of FIG. 2A, according to the present disclosure.

The HMD may present a virtual object to a user that is in line with another object. FIGS. 2A and 2B illustrate an embodiment of an HMD 202 simulating a virtual object 208 in a shared environment with at least one physical object 210. For example, the physical object 210 may be a wall of the physical environment, and the virtual object 208 may be an internet browser. The virtual object 208 may be presented to a user via a near-eye display 206 in the HMD 202. The virtual object 208 may be positioned in a shared environment 214 that includes the physical environment of the user and the virtual environment presented by the HMD 202. The shared environment 214 includes x-, y-, and z-positions and dimensions of both physical objects 210 and virtual objects 208.

For example, a camera 204 on the HMD 202 may image the surrounding physical environment and identify at least one physical object 210. The HMD 202 may calculate the position and dimensions of the physical object 210 relative to the camera 204 to "position" the physical object 210 in the shared environment 214. In some embodiments, the virtual object 208 may be positioned in the shared environment 214 at a distance from the HMD 202 that is greater than the distance of the physical object 210. Conventionally, the display and/or interaction with the virtual object 208 is limited or prevented by the closer physical object 210 obscuring the virtual object 208 in the shared environment 214. In some embodiments according to the present disclosure, a ray 212 cast through the physical object 210 and virtual object 208 may encounter a physics layer of the physical object 210 and a physics layer of the virtual object, detecting both objects, and filtering the physics layers based on a pre-determined priority of the physics layers. In other words, the system may prioritize the display and/or interaction of the virtual object 208 over the physical object 210, irrespective of distance from the HMD 202. For example, a user may view the virtual object 208 "through" the physical object 210 and/or interact with the virtual object 208 "through" the physical object 210 when presented on the near-eye display 206 at a simulated depth greater than the depth of the physical object 210.

FIG. 2B is a schematic representation of the shared environment 214 of FIG. 2A. FIG. 2B illustrates the HMD as a single approximated point of view (POV) 216. The POV 216 is the perspective of the virtual environment that is presented to a user in the near-eye display. In other words, in presenting the virtual information and/or objects to the user, the HMD may use the POV 216 as the location of the user.

In order to present objects to the user in the virtual environment 218 shown in FIG. 2B, the HMD may generate one or more physics layers to identify the position of physical and/or virtual objects. For example, the virtual environment 218 shown in FIG. 2B includes a first physics layer 220 of the virtual object 208 of FIG. 2A and a second physics layer 222 that corresponds to at least one surface of the physical object 210 of FIG. 2A. The physics layers may be used by the system and not presented to the user visually.

In some embodiments, the first physics layer 220 may be generated upon creation of the virtual object in the virtual environment 218 and/or upon visual presentation of the virtual object to the user. The second physics layer 222 may be generated by imaging the surrounding physical environment of the user with one or more cameras and creating a surface mesh. For example, the camera 204 of the HMD 202 of FIG. 2A may be a depth camera that measures the depth of surfaces of the physical object 210 relative to the HMD 202. One or more surface of the physical object may then be assigned a physics layer.

Referring again to FIG. 2B, when interacting with objects in the virtual environment 218 and/or a shared environment, a ray 212 may be cast along the cursor position (or other interaction device position) from the POV 216 or other origin. The ray 212 may extend through the first physics layer 220 and second physics layer 222. The ray 212 encountering the first physics layer 220 and the second physics layer 222 may indicate the relative position of the physics layers in the environment. The ray 212 may further detect a first depth 224 of the first physics layer 220 and a second depth 226 of the second physics layer 222. Conventionally, a computer system prioritizes interaction with objects based upon the proximity of the object to the POV 216 or other origin.

In some embodiments, a system according to the present disclosure may prioritize display and/or interaction with a virtual object irrespective of depth from the POV 216 or other origin. For example, the virtual object 208 of FIG. 2A may be displayed and interacted with "through" the physical object 210, despite the first depth 224 of the first physics layer 220 of FIG. 2B being greater than the second depth 226 of the second physics layer 222. In at least one embodiment, a system may break a "tie" in prioritization of a first physics layer 220 and a second physics layer 222 using the measured first depth 224 and second depth 226 as at least one factor in determining the prioritization of the physics layers. For example, a system may present two virtual objects that are prioritized over physical objects in the room. Each of the two virtual objects may be pre-prioritized equally over all other objects, and the display of the two virtual objects relative to one another may be determined by the nearer of the two virtual objects to the user.

In other embodiments, a system may prioritize display and/or interaction with a first object over a second object irrespective of the relative depth of the first object and second object from the POV 216, while maintaining the prioritization of other objects or layers. For example, the display and/or interaction with a virtual object may be prioritized over a desk chair, allowing the interaction and viewing of the virtual object without occlusion from the desk chair, while the desk itself may be allowed to occlude the virtual object. In another example, a system may display a plurality of virtual objects in a shared environment having a physical object therein, and prioritize the physics layers of each of the virtual objects in the shared environment over the physics layer of the physical object.

Figure 3:
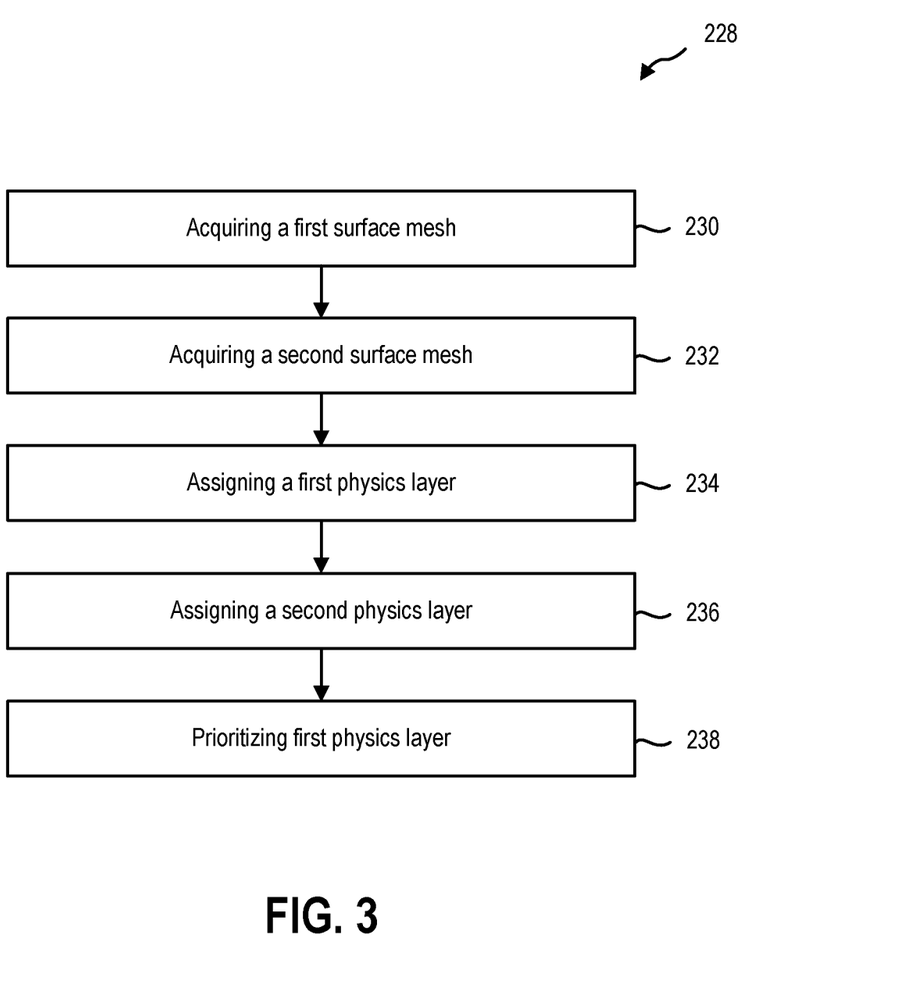
FIG. 3 is a flowchart illustrating an embodiment of a method of presenting virtual information to a user, according to the present disclosure.

FIG. 3 is a flowchart illustrating an embodiment of a method 228 of presenting virtual information to a user. In some embodiments, the method 228 may include acquiring a first surface mesh at 230 of a first object and acquiring a second surface mesh at 232 of a second object. While the present disclosure has described the first object and second object in relation of mixing a virtual object with a physical environment and/or object, in some embodiments, the first object and second object may both be virtual objects. For example, the first virtual object may be one or more control mechanisms and the second object may be a virtual representation of an airplane cockpit.

As used herein, a surface mesh should be understood to include at least a wireframe surface reconstruction of a physical object and a wireframe construction of a virtual object. Acquiring a surface mesh of a physical object may include creating a surface mesh from depth information from a depth camera. In another example, acquiring a surface mesh of a physical object may include loading or accessing a surface mesh from a storage device, such as a surface mesh of an airplane cockpit. Acquiring a mesh of a virtual object includes creating, loading, or accessing a wireframe of the virtual object. In some embodiments, the surface mesh of the virtual object may be the same as the wireframe used to render the virtual object. In other embodiments, the surface mesh may be a modified version of the wireframe used to render the virtual object, such as a portion of the wireframe used to render the virtual object or a volume larger than the wireframe used to render the virtual object.

The method 228 may further comprise assigning a first physics layer to the first surface mesh at 234 and assigning a second physics layer to the second surface mesh at 236. In some embodiments, a physics layer may be a planar surface tangent to a portion of a surface mesh. For example, a physics layer may be normal to an origin of a ray, such as the POV 216 illustrated in FIG. 2B. In other embodiments, a physics layer may include one or more surfaces that are coplanar with at least a portion of a surface mesh. In yet other embodiments, a physics layer may include one or more curved surfaces.

The method 228 further includes prioritizing the first physics layer over the second physics layer irrespective of a measure depth of the first physics layer and second physics layer at 238. As described herein, the first physics layer may be associated with a virtual object and the second physics layer may be associated with a physical object. In other embodiments, the first physics layer may be associated with a first virtual object and the second physics layer may be associated with a second virtual object.

In some embodiments, the first physics layer may be prioritized over all other physics layers, such that when a ray cast from an origin through the first physics layer and any other physics layer, the first physics layer may be prioritized first. For example, a ray cast from an origin through, in order of proximity, a second physics layer and a first physics layer may be return a priority order of the first physics layer followed by the second physics layer. In other embodiments, the first physics layer may be prioritized over at least one but not all other physics layers. For example, the first physics layer may be prioritized over the second physics layer, but there may be at least a third physics layer closer to the origin than the first physics layer that is given priority over the first physics layer. In other words, a ray cast from an origin through, in order of proximity, a third physics layer (closest to the origin), a second physics layer, and a first physics layer (furthest from the origin) may be return a priority order of the third physics layer, the first physics layer, and then the second physics layer.

Figure 4:
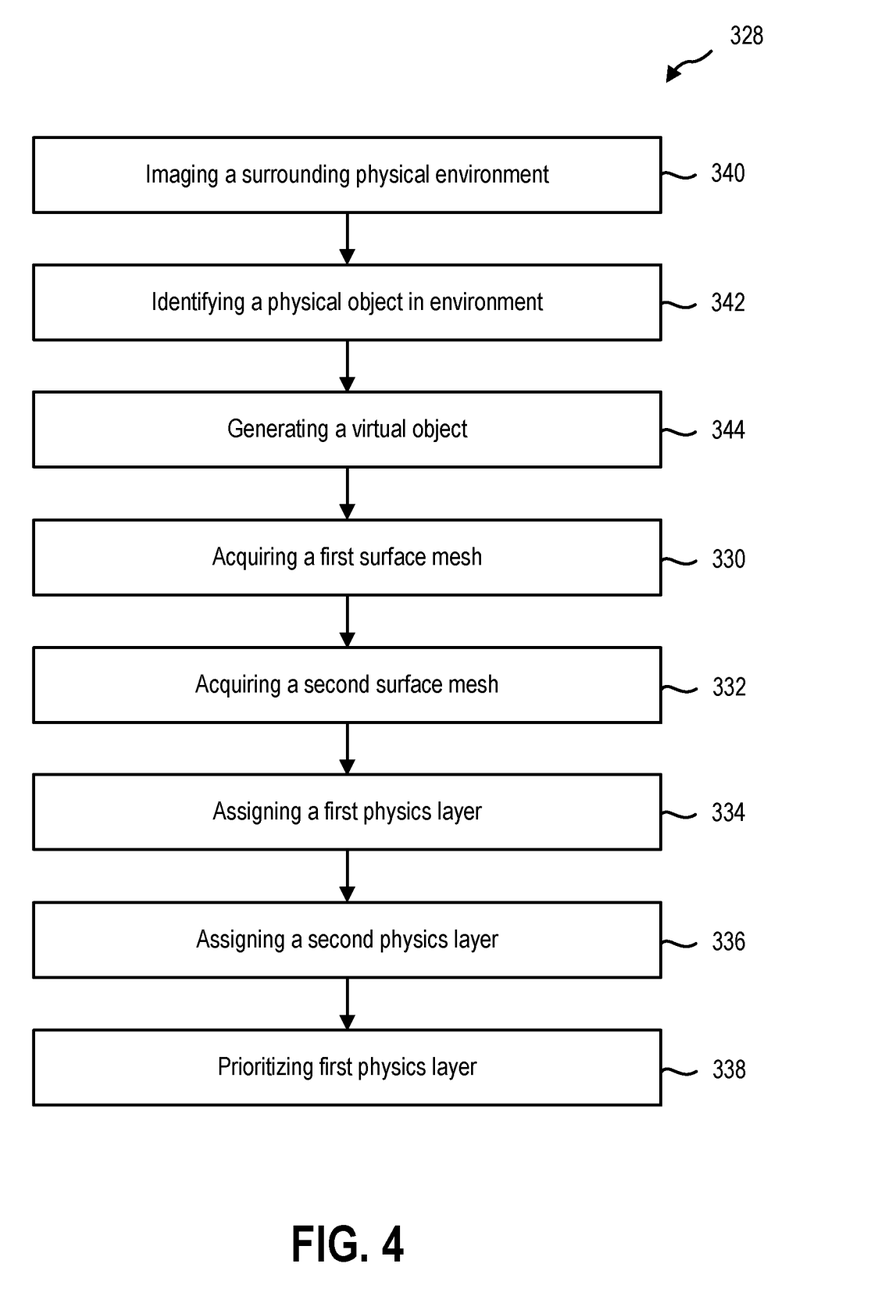
FIG. 4 is a flowchart illustrating another embodiment of a method of presenting virtual information to a user, according to the present disclosure.

While the embodiment of a method 228 in FIG. 3 may apply to a wholly virtual environment or a mixed environment, FIG. 4 illustrates an embodiment of a method 328 of presenting virtual information to a user in response to a measured physical environment. The method 328 includes imaging at least a portion of the surrounding physical environment of a camera at 340 and identifying a physical object in the surrounding physical environment at 342. The method further includes generating a virtual object in a virtual environment that overlaps with the surrounding physical environment to create a shared environment at 344. The shared environment includes elements of both the virtual environment and the physical environment in the same volume of space relative to a HMD or user. Identifying the physical object includes identifying a position of the physical object in the shared environment and/or identifying one or more edges of the physical object. The edge or edges of the physical object may be used to determine a dimension of the physical object.

After identifying the physical object at 342 and generating the virtual object at 344, the method 328 includes acquiring a first surface mesh of the virtual object at 330 and acquiring a second surface mesh of the physical object at 332. As described, in some embodiments, acquiring a surface mesh may include loading or accessing a known surface mesh for an object, virtual or physical, from a storage device. For example, identifying a physical object at 342 may include identifying the physical object within a database or other information array in a storage device. In another example, the physical object in the physical environment may include one or more identification tags to aid in identifying the physical object and accessing a surface mesh of the physical object. In particular, the physical object may include a visual identification tag, such as a unidirectional barcode, a data matrix barcode, a stacked barcode, or other visual identification tag, or a non-visual identification tag, such as a radio frequency identification tag (RFID), a near-field communication (NFC) identification tag, or other non-visual identification tag.

In other embodiments, acquiring a surface mesh may include constructing a surface mesh from depth information acquired during imaging of the physical environment at 340. For example, imaging the physical environment may include using a passive depth camera, such as a stereo camera, or active depth camera, such as a time-of-flight camera or a structured light camera, to image the surrounding environment with multiple depth layers in each frame. Edge detection of the physical object in each depth layer of a frame may allow for a surface mesh reconstruction of the surfaces and dimensions of the physical object.

The method 328 comprises assigning a first physics layer to the first surface mesh at 334 and assigning a second physics layer to the second surface mesh at 336, such as as described in relation to FIG. 3. The physics layer may allow the system to calculate the depth and/or interaction priority of the objects, and the method 328 further comprises prioritizing the first physics layer over the second physics layer irrespective of a measure depth of the first physics layer and second physics layer at 338.

The display and/or interaction order of a first object and a second object is determined by casting a ray from an origin. Any physics layers through which the ray passes are conventionally ordered by the proximity to the origin of each physics layer. As described in the present disclosure, one or more of the physics layers may be prioritized over other physics layers to provide beneficial display and control effects. While the display and interaction with a first object "through" a second object have been described in relation to a near-eye display or within a HMD as the origin of the ray, in other embodiments, the ray may be cast from a different origin.

Figure 5:
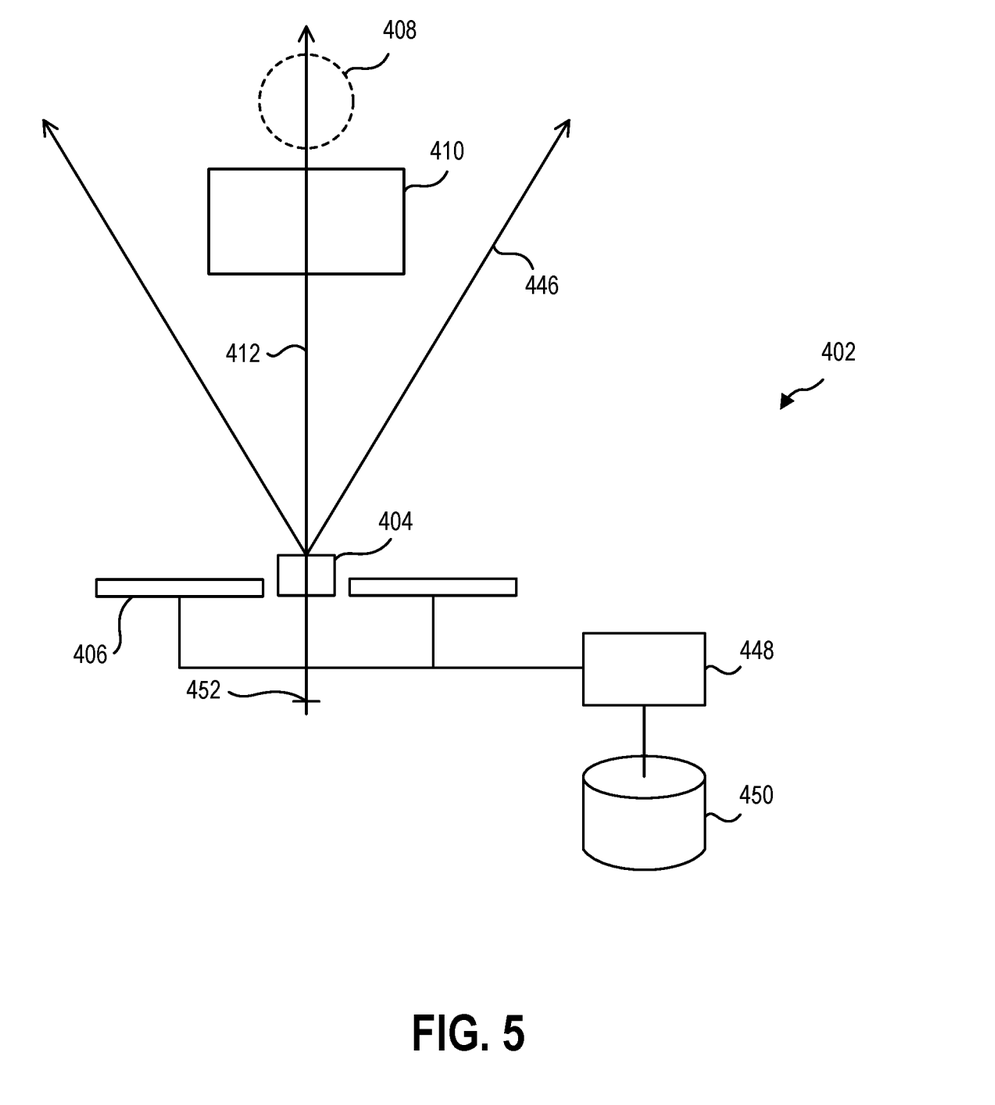
FIG. 5 is a schematic representation of an embodiment of a system for providing virtual information in a near-eye display, according to the present disclosure.
Figure 6:
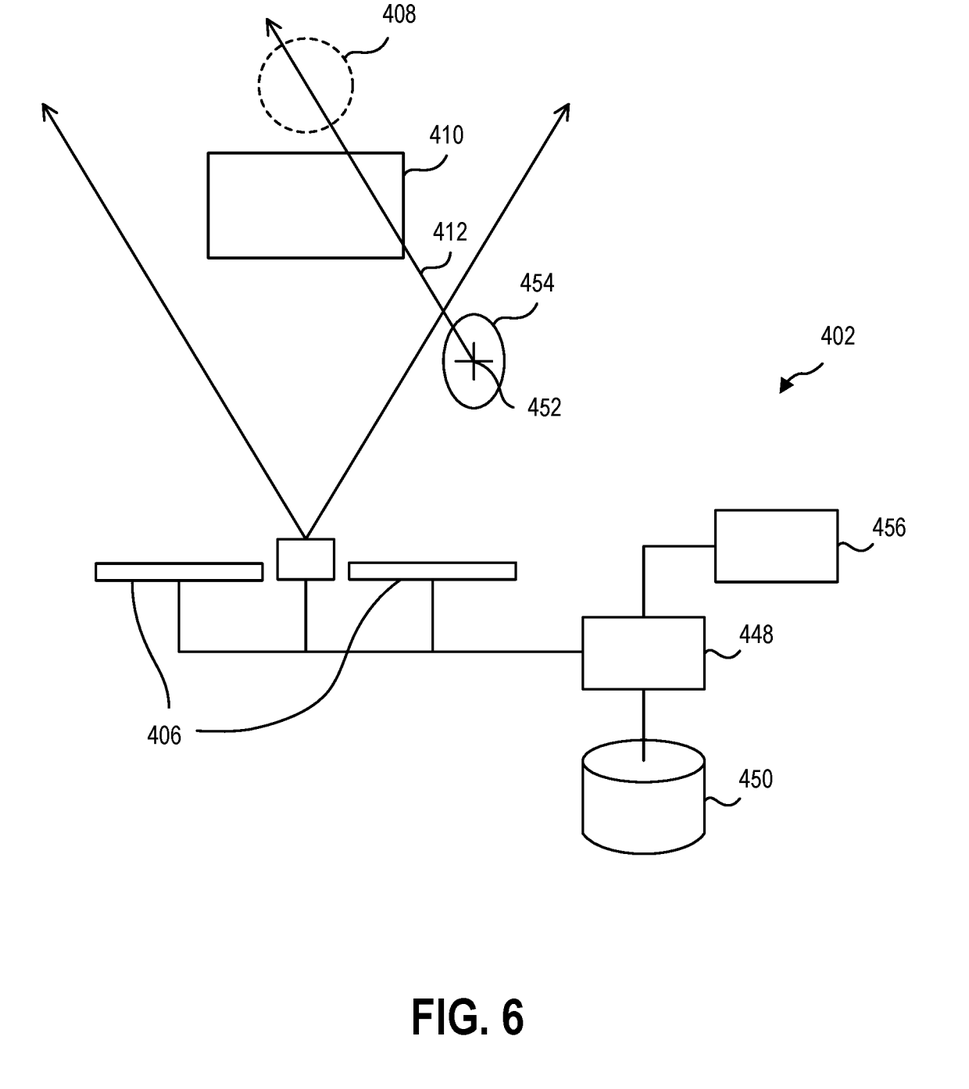
FIG. 6 is a schematic representation of an embodiment of a system for providing virtual information in a near-eye display with a peripheral controller, according to the present disclosure.
Figure 7:
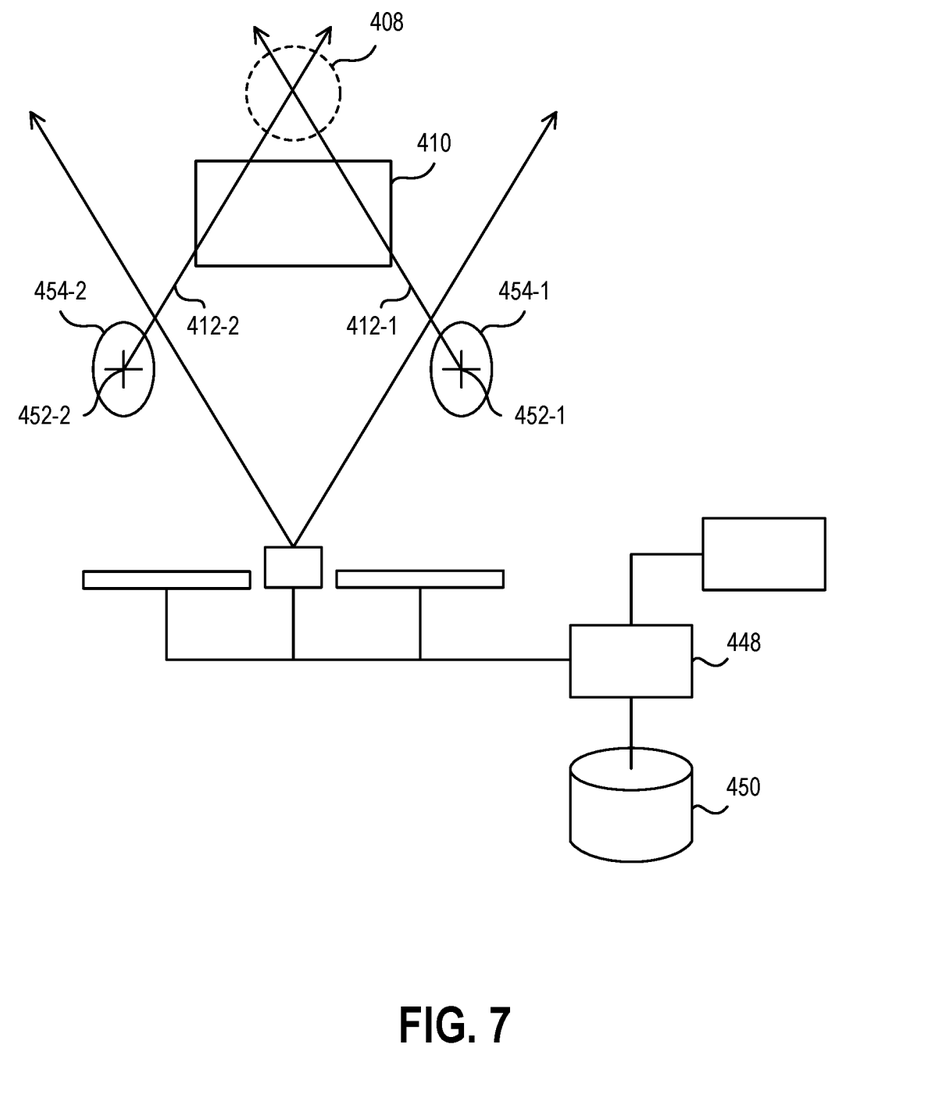
FIG. 7 is a schematic representation of an embodiment of a system for providing virtual information in a near-eye display with a plurality of peripheral controllers, according to the present disclosure.

FIG. 5 through FIG. 7 illustrate different embodiments of ray origins using a HMD or peripheral controllers as example sources of a ray. FIG. 5 is a schematic representation of another embodiment of a HMD 402 for presenting virtual information to a user in a mixed reality environment including a camera 404 and a near-eye display 406. The camera 404 may image a physical object 410 in a field of view 446 of the camera 404. In other embodiments, a HMD may lack a camera and provide a fully virtual environment to user.

A system for providing virtual information to a user includes a HMD 402. The system includes a microprocessor 448 in data communication with the near-eye display 406 and with the camera 404, when a camera is present. The microprocessor 448 may be a general process CPU, a portion of a dedicated system-on-chip, a GPU, or other microprocessor configured to process visual renderings. The microprocessor 448 may be in data communication with a storage device 450.

In some embodiments, the microprocessor 448 is part of the HMD 402. In other embodiments, the microprocessor 448 is remote from the HMD 402 (e.g., not in a housing of the HMD 402) and may communicate with the HMD 402 via wired or wireless data communication. In some embodiments, the storage device 450 is part of the HMD 402. In other embodiments, the storage device 450 is remote from the HMD 402 (e.g., not in a housing of the HMD 402) and/or the microprocessor 448 and may communicate with the HMD 402 and/or microprocessor 448 via wired or wireless data communication. The storage device 450 may be a platen-based storage device, solid state storage device, a cloud storage device, a distributed storage device, or other storage device accessible by the microprocessor 448.

The storage device 450 may include instructions thereon that, when executed by the microprocessor 448, cause the microprocessor 448 and/or HMD 402 to perform any of the methods described herein. For example, the microprocessor 448 may communicate with the near-eye display 406 to display a virtual object 408 at a location farther from the HMD 402 than the physical object 410. The microprocessor 448 may cast a ray 412 from an origin 452 at or within the HMD 402. In some examples, the origin 452 may be between or in the near-eye displays 406. In other examples, the origin 452 may be in or on the camera 404. In yet other examples, the origin 452 may be behind the near-eye display 406, such as within a user's head when the HMD 402 is worn to replicate the user's point of view. The direction of the ray 412 may, therefore, change as the user moves their head and/or the HMD 402 to different positions.

In other embodiments, the origin of a ray may be positioned away from the HMD or the user's head. FIG. 6 is a schematic representation of the HMD 402 of FIG. 5 with a peripheral controller 454. For example, the peripheral controller may be a hand-held controller. In another example, the peripheral controller 454 may be part of another device, such as a smartphone, a laptop computer, a tablet computer or another computing device; another camera; or another orientation sensing device.

The microprocessor 448 may be in data communication with a communication device 456. The communication device 456 may communicate with the peripheral controller 454 and/or track the position of the peripheral controller 454. For example, the peripheral controller 454 may be a six degree-of-freedom (DOF) controller that measures x-, y-, and z-direction translation as well as pitch, roll, and yaw of the peripheral controller 454. The microprocessor 448 may cast a ray 412 from an origin 452 in or on the peripheral controller 454 based on the position and/or orientation of the peripheral controller 454. In another example, the origin 452 may be positioned relative to the peripheral controller 454 displaced from the peripheral controller 454. For example, the origin 452 may be located at a position displaced 5.0 centimeters in a direction from the center of the peripheral controller 454.

The ray 412 may encounter a first physics layer of the virtual object 408 and the second physics layer of the physical object 410 (as described in relation to FIG. 2B). The ray 412 may, therefor, change orientations as the user moves the peripheral controller to different positions independently of the position of the HMD 402 or user.

An example application of an origin 452 positioned in a peripheral controller 454 may be a computer game in which the peripheral controller simulates a tool that allows interaction with objects behind a wall. An example application of an origin 452 displaced from the peripheral controller 454 may be a computer game in which the peripheral controller simulates a handheld object and the ray simulates the perspective of a virtual tool that allows interaction with objects behind a wall, where the tool is connected to a side of the handheld object in the virtual environment.

FIG. 7 illustrates yet another example of a system including an HMD 402 and a first peripheral controller 454-1 and a second peripheral controller 454-2. In such an example, the microprocessor 448 may cast a first ray 412-1 from a first origin 452-1 and a second ray 412-2 from a second origin 452-2. The first origin 452-1 may be positioned on or in the first peripheral controller 454-1, and the second origin 452-2 may be positioned on in the second peripheral controller 454-2. In another example, the first origin 452-1 may be positioned relative to the first peripheral controller 454-1 displaced from the first peripheral controller 454-1, and the second origin 452-2 may be positioned relative to the second peripheral controller 454-2 displaced from the second peripheral controller 454-2.

An example application of a plurality of rays 412-1, 412-2 may be a computer game in which the first peripheral controller 454-1 simulates a tool that projects a portal to reveal objects behind a wall and the second peripheral controller 454-2 simulates a weapon that allows the user to defend themselves against enemies behind the wall. In yet another example, the first origin 452-1 may be located relative to a first peripheral controller 454-1 and the second origin 452-2 may be located in or near the HMD 402 to simulate a user's point of view.

A system according to the present disclosure may enable presentation and interaction with virtual objects through one or more virtual or physical objects at a simulated position on a far side of the one or more virtual or physical objects. Interacting with virtual objects at a location beyond the limitations of the physical or virtual environment in which the user is constrained may reduce fatigue, improve ease-of-use, and increase functionality over conventional presentation of virtual information.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic system, the electronic system comprising:
   a head-mounted display (HMD) including:
      a camera, and
      a near-eye display;
   a microprocessor in data communication with the camera and the near-eye display; and
   a storage device in data communication with the microprocessor, the storage device having instructions stored thereon which when executed by the microprocessor cause the microprocessor to:
      image at least a part of a surrounding physical environment with the camera,
      identify a physical object in the surrounding physical environment and acquiring a physical object surface mesh of the physical object,
      generate a virtual object for display on the near-eye display in a virtual environment where the virtual environment and surrounding physical environment overlap in a shared environment, the virtual object having a virtual object surface mesh,
      assign a first physics layer to the virtual object surface mesh of the virtual object,
      assign a second physics layer to the physical object surface mesh of the physical object,
      cast a ray from an origin through the first physics layer and the second physics layer to determine a priority order based on relative depth and position of the first physics layer and the second physics layer wherein the second physics layer is closer to the origin than the first physics layer; and
      prioritize the first physics layer over the second physics layer in the priority order independent of the relative depth and position of the virtual object and the physical object from the HMD in a shared environment for interactions with the virtual object and the physical object such that no part of the virtual object is obscured by the physical object irrespective of the relative position of the origin to the physical object as the origin moves relative to the physical object.

2. The system of claim 1, the camera being a depth camera.

3. The system of claim 1, the microprocessor being part of the head-mounted display.

4. The system of claim 1, the instructions further causing the microprocessor to prioritize the entire first physics layer over the second physics layer.

5. The system of claim 1, the origin being in or on the head-mounted display.

6. The system of claim 1, the origin being in or on a peripheral device.

7. The system of claim 6, the peripheral device being in data communication with the microprocessor.

8. A method of presenting visual information to a user, the method comprising:
   imaging at least a part of a surrounding physical environment with a camera of a head-mounted device (HMD);
   identifying a physical object in the surrounding physical environment and acquiring a physical object surface mesh of the physical object;
   generating a virtual object for display on a near-eye display of the HMD in a virtual environment where the virtual environment and surrounding physical environment overlap in a shared environment, the virtual object having a virtual object surface mesh;
   assigning a first physics layer to the virtual object surface mesh;
   assigning a second physics layer to the physical object surface mesh;
   casting a first ray from a first origin through the first physics layer and the second physics layer to determine a priority order based on relative depth of the first physics layer and the second physics layer wherein the second physics layer is closer to the first origin than the first physics layer;
   prioritizing the first physics layer over the second physics layer in the priority order independent of a first depth of the first physics layer and a second depth of the second physics layer in a shared environment relative to the user for interactions with the virtual object associated with the virtual object surface mesh and the physical object associated with the physical object surface mesh such that no part of the virtual object is obscured by the physical object irrespective of the relative position of the first origin to the virtual object as the origin moves relative to the physical object; and
   displaying the virtual object to the user with the near-eye display.

9. The method of claim 8, further comprising interacting with the first physics layer independently of the second physics layer.

10. The method of claim 8, casting a first ray from a first origin including creating a proximity order of the first physics layer and the second physics layer based on the relative depth.

11. The method of claim 10, wherein the priority order is different from the proximity order.

12. The method of claim 8, the first origin being in or on the near-eye display.

13. The method of claim 8, the first origin being in or on the user.

14. The method of claim 8, further comprising a casting a second ray from a second origin.

15. The method of claim 8, the first origin being in or on a peripheral controller.

16. The method of claim 8, further comprising casting a second ray from a second origin.

17. The method of claim 8, wherein prioritizing the first physics layer over the second physics layer includes prioritizing the entire first physics layer over the second physics layer.

18. The method of claim 17, further comprising breaking a prioritization tie of two or more physics layers with the first depth and second depth.

19. A non-transitory computer readable medium, the computer readable medium having instructions stored thereon that, when executed by a microprocessor, cause the microprocessor to perform a method comprising:

imaging at least a part of a surrounding physical environment with a camera of a head mounted device (HMD), identifying a physical object in the surrounding physical environment and acquiring a physical object surface mesh of the physical object, generating a virtual object for display on a near-eye display of the HMD in a virtual environment where the virtual environment and surrounding physical environment overlap in a shared environment, the virtual object having a virtual object surface mesh, assigning a first physics layer to the virtual object surface mesh;

assigning a second physics layer to the physical object surface mesh;

casting a first ray from a first origin through the first physics layer and the second physics layer to determine a priority order based on relative depth of the first physics layer and the second physics layer wherein the second physics layer is closer to the origin than the first physics layer;

prioritizing the first physics layer over the second physics layer in the priority order when the first physics layer is positioned behind the second physics layer and the first physics layer has a greater relative depth than the second physics layer relative to an origin in a shared environment for interactions with the virtual object associated with the virtual object surface mesh and the physical object associated with the physical object surface mesh such that no part of the virtual object is obscured by the physical object irrespective of the relative position of the origin to the virtual object as the origin moves relative to the physical object; and displaying the virtual object to the user with the near-eye display.

20. The computer readable medium of claim 19, the method further comprising interacting with the first physics layer independently of the second physics layer.

* * * * *